United States Patent
Matsumoto et al.

(10) Patent No.: US 6,632,878 B1
(45) Date of Patent: Oct. 14, 2003

(54) PRODUCTION PROCESS FOR POLYMERS WITH HYDROXYL GROUPS AND POLYMERS OBTAINED BY THE PROCESS

(75) Inventors: Yoichi Matsumoto, Kurashiki (JP); Naoki Fujiwara, Kurashiki (JP); Toshiaki Sato, Kurashiki (JP); Fumio Nakahara, Bizen (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/631,287

(22) Filed: Aug. 2, 2000

(30) Foreign Application Priority Data

Aug. 6, 1999 (JP) .......................................... 11-223152

(51) Int. Cl.⁷ .............................. C08F 8/12; C08F 16/06; C08F 118/08
(52) U.S. Cl. ................... 525/62; 525/330.6; 525/328.9; 525/383
(58) Field of Search ................................ 525/62, 330.6, 525/383, 328.9

(56) References Cited

U.S. PATENT DOCUMENTS

| | | | |
|---|---|---|---|
| 3,386,978 A | 6/1968 | Salyer | |
| 4,307,211 A | 12/1981 | Ito et al. | |
| 5,244,934 A | 9/1993 | Umeda et al. | |
| 5,386,055 A | * | 1/1995 | Lee et al. ................ 562/512.2 |

FOREIGN PATENT DOCUMENTS

| | | |
|---|---|---|
| DE | 196 48 155 | 5/1997 |
| EP | 0 854 165 | 7/1998 |
| GB | 305043 | 1/1929 |
| GB | 959148 | 5/1964 |
| JP | 10-265507 | 10/1998 |

OTHER PUBLICATIONS

Morrison et al., Organic Chemistry, 2$^{nd}$ ed., Allyn and Bacon, Inc., Boston, Mass, pp 160–161 (1966).*
Finch, ed., Polyvinyl Alcohol, John Wiley & Sons, New York, pp 91–93 (1973).*

* cited by examiner

Primary Examiner—D. R. Wilson
(74) Attorney, Agent, or Firm—Oblon, Spivak, McClelland, Maier & Neustadt, P.C.

(57) ABSTRACT

A hydroxyl group containing polymer is prepared by a process, comprising:

contacting the polymer having a substituent with high temperature, high pressure water, thereby converting the substituent to hydroxyl groups.

8 Claims, 2 Drawing Sheets

PRODUCTION PROCESS FOR POLYMERS WITH HYDROXYL GROUPS AND POLYMERS OBTAINED BY THE PROCESS

BACKGROUND OF THE INVENTION

1. Field of the Invention

The present invention relates to a process for the production of polymers with hydroxyl groups. More specifically, the present process relates to a process for the production of polymers with hydroxyl groups by contacting a polymer having a substituent with high temperature, high pressure water, thereby introducing hydroxyl groups into the polymer.

2. Description of the Background

Polymers with hydroxyl groups are becoming increasingly useful because of their excellent properties, particularly including hydrophilicity and reactivity, and they have been the focus of much research in the past. An example is a process by which the surface of polyethylene is treated with a plasma, the result of which is the introduction of hydroxyl groups into the polymer (R. B. Blyth et al., Polym. Vol. 19 (1978), p. 1273). This process is based on plasma treatment, but the low reaction efficiency for hydroxyl group introduction has prevented its application beyond the experimental level.

Another example of a process of introducing hydroxyl groups into a polymer is the saponification of a carboxylic acid vinyl ester such as polyvinyl acetate to produce polyvinyl alcohol (PVA). Polyvinyl alcohol (PVA) is an industrially useful polymer employed for a variety of uses including the manufacture of fibers, paper, adhesives, emulsifiers and films. Polyvinyl alcohol is usually obtained by the saponification of polyvinyl acetate in an alcohol solvent such as methanol, using an alkali catalyst such as sodium hydroxide (Nagano et al., "Poval" (1970 edition), Kobunshi Publications). The saponification reaction is conducted by converting the acetoxyl groups of polyvinyl acetate to hydroxyl groups and it has been used industrially, but with the vast increase in the use of PVA in recent years there has been a desire to reduce the volatile organic components such as alcohol and the ash derived from the catalyst, that remain in the PVA.

When the conventional process is employed to conduct the above-described saponification reaction, it is difficult to completely remove impurities from the product, and this has led to suggestions that the process itself is in need of fundamental examination. Japanese Laid-open Patent Publication No. Hei-10-265507 proposes a process in which hydroxyl groups are introduced into a polymer having an electron attracting group by contact of the polymer with an alcohol at high temperature and high pressure. This process takes advantage of the solubilizing power of alcohols for polymers at high temperature and high pressure, and their ability to permeate into polymer particles and to allow introduction of hydroxyl groups into the polymer within a short period of time. The process is a very revolutionary process from the standpoint of reaction efficiency. Nevertheless, while this process permits the introduction of hydroxyl groups into the polymer within a short period of time, the above-mentioned problems of organic volatile components and ash remain unsolved.

SUMMARY OF THE INVENTION

Accordingly, one object of the present invention is to provide a process of producing polymers with hydroxyl groups in which the hydroxyl groups are introduced into the polymers in a short period of time and which results in a polymer product having a very low organic volatile component and ash content.

Briefly, this object and other objects of the present invention as hereinafter will become more readily apparent can be attained by a process of producing a polymer having hydroxyl groups, comprising:

contacting the polymer having a substituent with high temperature, high pressure water, thereby converting the substituent to hydroxyl groups.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an IR spectrum of polyvinyl acetate which is used as a starting material, and.

DESCRIPTION OF THE PREFERRED EMBODIMENTS

Figure 1:
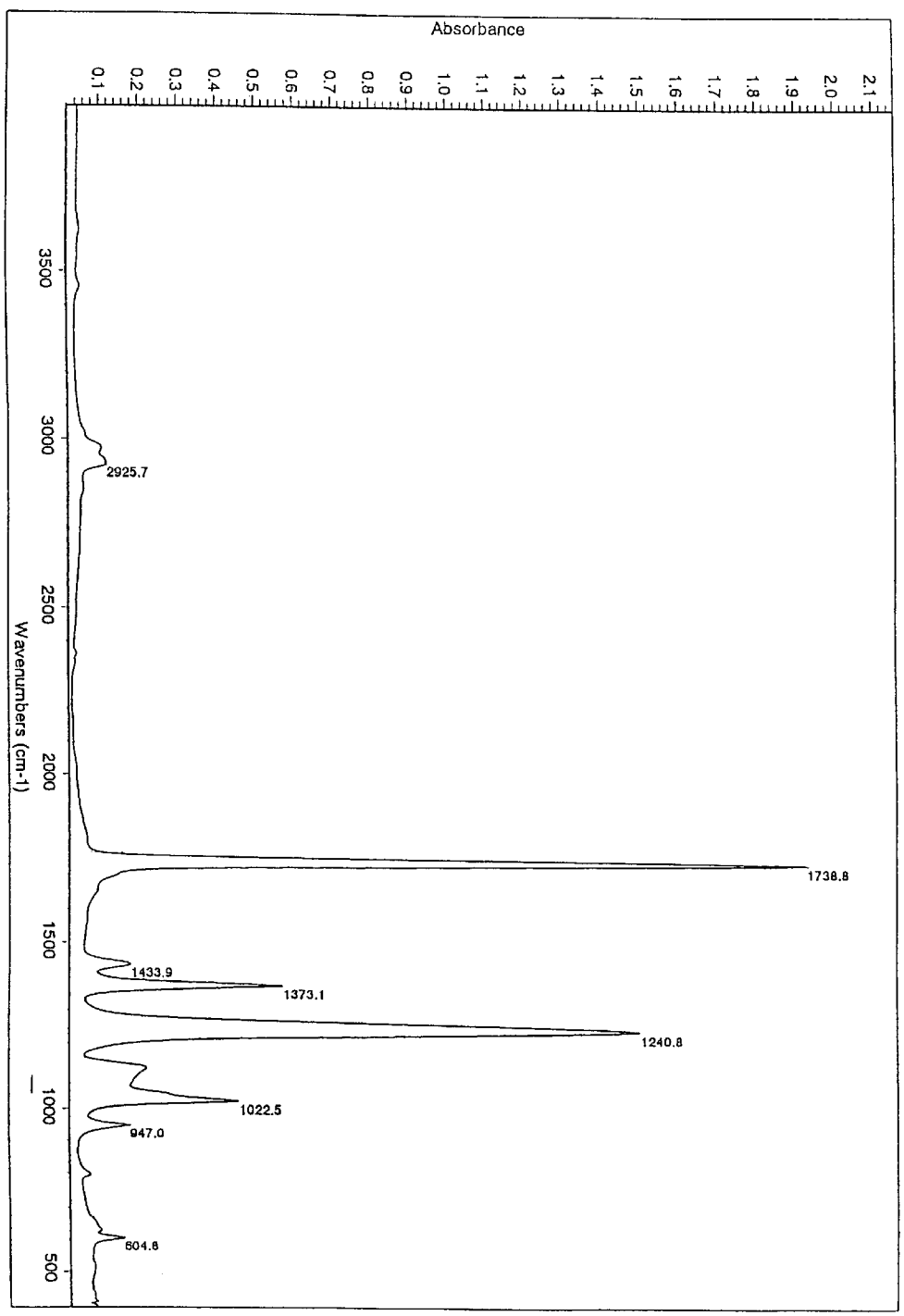

The present invention is the result of research directed to the development of a process for the production of polymers having hydroxyl groups and at the same time not contaminated with impurities and offering excellent reaction efficiency. The finding of the invention is that high temperature, high pressure water has a solubilizing power on polymers that otherwise have poor affinity for water. The water is able to permeate into the polymer particles, while itself exhibiting a catalytic effect. In other words, the present invention provides a process for production of polymers with hydroxyl groups whereby a polymer having a substituent is contacted with high temperature, high pressure water which results in the conversion of the substituent to hydroxyl groups.

The present invention provides a process for the production of polymers containing hydroxyl groups, and polymers obtained by the process of production. Since the invention makes it possible to introduce hydroxyl groups much more rapidly into polymers than by conventional hydroxyl group introduction techniques and leaves no organic volatile components or ash in the polymers, it has high industrial utility.

For a process embodiment of the invention for the production of polymers having hydroxyl groups, it is necessary for the polymer which is to be contacted with the high temperature, high pressure water to have a substituent. Suitable examples of substituents include ester groups such as acetoxy, alkoxy, carboxyl, carbonyl, halogen, nitrile, nitro and the like.

Suitable polymers having an ester group as the substituent include poly(meth)acrylic acid esters such as polymethyl (meth)acrylate, polyethyl(meth)acrylate and polypropyl acrylate; poly(carboxylic acid vinyl esters) such as polyvinyl acetate and polyvinyl butyrate; and poly(vinyl carboxylate) copolymers such as ethylene-vinyl acetate copolymer.

Suitable polymers having an alkoxy group as the substituent include polyvinyl methyl ether, polyvinyl ethyl ether and polyvinyl butyl ether. Suitable polymers having a carboxyl group as the substituent include polycarboxylic acids such as poly(meth)acrylic acid. Suitable polymers having a carbonyl group as the substituent include polymethyl vinyl ketone. Suitable polymers having a halogen group as the substituent include polyvinyl chloride, polyvinylidene chloride and polyvinyl fluoride. Suitable polymers having a nitrile group as the substituent include polyacrylonitrile. Suitable polymers having a nitro group as the substituent include polynitroethylene. Suitable polymers also include copolymers prepared from suitable comonomers. Polymers having an ester group or an alkoxy group as the substituent are preferred among the above indicated polymers for their notable expression of the effect of the invention.

The above-mentioned polymers with ester groups may also be copolymers copolymerized with other monomers, so long as the effect of the invention is not impeded, and examples of such monomers include unsaturated carboxylic acids such as (meth)acrylic acid, crotonic acid, itaconic acid and maleic anhydride; mono- and dialkyl esters; nitriles such as (meth)acrylonitrile; amides such as (meth)acrylamide; olefin sulfonic acids such as ethylene sulfonic acid and (meth)allylsulfonic acid, and salts thereof; as well as alkyl vinyl ethers, polyoxyalkyl allyl ethers, alkyl ethers, saturated carboxylic acids, allyl esters, vinyl ketone, N-methylpyrrolidone, vinylidene chloride, vinylidene fluoride, oxyalkylene group-containing unsaturated vinyl monomers, vinyl alkoxysilanes, and the like.

When the hydroxyl group is introduced into the polymer having the substituent, the polymer may undergo a decomposition reaction, depending on the type of main chain. In order to prevent decomposition of the main chain of the polymer, it is preferred that the polymer main chain be composed of carbon-carbon bonds. Examples of such types of polymers include polymers with the above-mentioned ester groups, alkoxy groups, carboxyl groups, carbonyl groups, halogen groups, nitrile groups and nitro groups. Polyvinyl acetate is particularly preferred for its industrial advantages.

The polymer with the substituent is contacted with high temperature, high pressure water to convert the substituent to a hydroxyl group, and the water used in the process is not limited to water alone, since water mixed with other substances that increase the solubility of the starting polymer or the swelling property of the starting polymer may be used, so long as the effect of the invention is not hampered. Suitable such substances include substances that exhibit an effect at high temperature and high pressure. Examples of substances that increase the solubility of the starting polymer include alcohols such as methanol, ethanol, propanol, and the like., which are miscible with high temperature, high pressure water, have no carbon-oxygen bonds with the oxygen other than that of hydroxyl group, or electron attracting groups, and have a boiling point which permits easy separation of the substance from the resulting polymer with the hydroxyl group. Substances which increase the swelling of the starting polymer at relatively low temperature include carbon dioxide and hydrocarbons such as ethane, butane, and the like. Inert substances may also be used therewith in order to adjust the reaction rate for the introduction of the hydroxyl group, so that such substances can also function as reaction adjustors.

Water which exists at high temperature and high pressure exhibits different properties from normal water. At increased temperature, liquid water has a lower density and a lower permittivity, and exhibits a tendency toward a greater ionic product; however, water at high temperature and high pressure, because of a reduction in permittivity, exhibits affinity for starting polymers which normally have low affinity for water, thus improving its solubility and interior permeation with respect to the polymers. The critical temperature for water (the temperature of the critical point of the gas phase/liquid phase) is 647° K and its critical pressure (the pressure of the critical point of the gas phase/liquid phase) is 22 MPa; water above this critical point is known as supercritical water. Supercritical water not only has a lower permittivity than high temperature water which is in liquid form, but also has unique properties such as low viscosity, a large diffusion coefficient and low surface tension, and exhibits greater permeation into the interior of resin particles.

In addition, high temperature, high pressure water has a large ionic product, exhibiting its maximum value near the critical temperature, though this depends on the pressure. The concentration of hydrogen ions and hydroxy ions that exhibit a catalytic effect is, therefore, higher. It is thus possible to accelerate the reaction converting the substituent of the substituent-containing polymer to hydroxyl without adding any reaction promoting catalyst, or only a small amount of the catalyst. While the reason for this has not been fully explained, it is conjectured that the above-mentioned properties of the high temperature, high pressure water allow easier permeation of the water into the interior of the resin particles and that a nucleophilic attack by water on the substituents of the polymer occurs thereby introducing hydroxyl groups into the polymer. The attack by water molecules on the polymer is facilitated by the moderately positively charged carbon atoms bearing the substituent of the polymer.

Water which is defined as high temperature, high pressure water includes water not only in the above-mentioned supercritical region, but also in the subcritical region. Subcritical water, as defined for the purposes of the invention, is high temperature, high pressure water near the critical point that has not reached the supercritical temperature or supercritical pressure, and it is water at a temperature of 500° K or above and a pressure of 2.6 MPa or higher. The hydroxyl group-introducing reaction of the invention proceeds satisfactorily near the critical point, and also proceeds satisfactorily in the subcritical region. In the supercritical region, the reaction proceeds more satisfactorily at the low temperature end in the region near the critical point. Depending on the type of substituent, it is possible to achieve a sufficiently high reaction rate even in the subcritical region with a temperature 100° K or more below the critical temperature.

If the temperature of the water is too low, the reaction rate will be slower, and if it is too high, the reaction rate will be faster rendering it more difficult to control and the polymer may undergo decomposition, thus lowering the polymer yield, The reaction is preferably conducted at 373 to 800° K. It is more preferably conducted at 473 to 750° K, and even more preferably at 510 to 600° K.

The pressure of the water during the reaction is determined by the charging volume, composition and reaction temperature in cases where the reaction vessel is a closed system with little exchange of substances and, therefore, little change in the number of moles before and after the reaction. However, if the pressure is too low, the substitution reaction f or introduction of the hydroxyl groups into the polymer will be hampered, and if it is too high, thermal decomposition will occur more readily. The reaction is, therefore, preferably conducted at a pressure of 0.1 to 62 MPa, more preferably 1 to 50 MPa, and even more preferably at 2 to 40 MPa.

High temperature, high pressure water alone may be used for the process of the invention, but an alkali may also be included in order to produce a polymer with hydroxyl groups at a high yield in a short time, for further improved efficiency of converting the polymer substituent to hydroxyl.

The alkali used for the reaction is not particularly restricted so long as it is soluble or dispersible in water, and it is possible to use hydroxides of alkali metals or alkaline earth metals, oxides of alkali metals or alkaline earth metals, and numerous types of electron donor compounds such as Lewis bases and ammonia.

Suitable examples of alkali compounds include alkali metal hydroxides such as sodium hydroxide, lithium hydroxide and potassium hydroxide; alkaline earth metal hydroxides such as magnesium hydroxide, calcium hydroxide and barium hydroxide; other hydroxides such as aluminum hydroxide; alkali metal oxides such as sodium oxide, lithium oxides and potassium oxide; alkaline earth metal oxides such as magnesium oxide, calcium oxide and barium oxide; other oxides such as aluminum oxide; as well as ammonia and alkaline ammonia derivatives. Lewis bases that are electron donors in acid base reactions may also be used as alkaline substances. However, when a metal-containing alkali is used it will result in residual ash in the polymer after the reaction and, therefore, in order to obtain a polymer with no ash it is necessary to use an alkali containing no metal.

For production of a polymer with hydroxyl groups in a short period of time in high yield by the process of the invention, an acid may also be included to improve the efficiency of conversion of the polymer substituent to hydroxyl. The acid used for the reaction is not particularly limited so long as it is soluble or dispersible in water. Suitable acids include inorganic acids such as sulfuric acid and hydrochloric acid, organic acids such as acetic acid and an alkylsulfonic acid, or a solid acid such as a zeolite or a metal oxide.

Specific examples of acids include inorganic acids such as sulfuric acid, nitric acid, phosphoric acid and boric acid; hydrogen halide acids such as hydrochloric acid and hydrobromic acid; organic carboxylic acids such as formic acid, acetic acid and propionic acid; organic sulfonic acids such as methane sulfonic acid and benzene sulfonic acid; and solid acids such as zeolites, silica-aluminas and zirconium oxide. However, because of the possibility of residual ash in the polymer after the reaction when an acid such as phosphoric acid or boric acid or an acid containing a metal is used, in order to prepare a polymer with no ash therein, a volatile acid or an acid that can be separated from the solution after the reaction by a method such as filtration is preferably used. When an acid is used, a corrosion resistant material such as stainless steel is preferably used for the apparatus in order to prevent corrosion of the apparatus.

Introduction of the hydroxyl groups into the polymer can be confirmed by measuring the infrared absorption spectrum of the polymer before and after the reaction. That is, the introduction of hydroxyl groups can be determined based on reduction of the absorption peak representing the substituent, and by the appearance of an absorption peak attributable to the stretching vibration of the O—H bond, near the absorption range of 3100 to 3700 $cm^{-1}$. Measurement of the infrared absorption spectrum is preferably conducted with vacuum drying at a low temperature at which the product does not degenerate, to avoid influence of the residual water and solvent. The infrared absorption spectrum of the hydroxyl group bonded to the carbon in the polymer will generally have an absorption peak ranging from 3200 to 3600 $cm^{-1}$, although the peak position may be slightly shifted because of the interacting effects of adjacent groups.

According to the invention, the yield of polymer with hydroxyl groups can exceed 85%. This high yield achieved by the present invention is possible because the hydroxyl groups introduced into the polymer molecules result in partially chelated bonds between the polymer molecules and the solvent molecules, as well as the presence of hydrogen bonding. Moreover, the process of the invention allows the introduction of hydroxyl groups to be accomplished in a short period of time. Specifically, the introduction of hydroxyl groups can be accomplished in less than about 30 minutes at a constant temperature, but depending on the type of starting polymer and the conditions, almost complete introduction of the hydroxyl groups is possible in less than about 10 seconds. In order to avoid side reactions from occurring on the polymer main chain, the reaction time is preferably controlled so that it is as short as possible.

Since the process of the invention allows introduction of hydroxyl groups into a polymer without using a catalyst, or in the presence of a catalyst containing little or no metal, it is possible to obtain a polymer with hydroxyl groups that contains substantially no ash. Ash is a component that remains after 2 hours of treatment of a polymer in air in a 700° C. electric furnace, and it is usually an oxide of the catalyst metal used for introduction of the hydroxyl groups. "Substantially no ash" means an amount requiring no procedure such as washing when the hydroxyl group-containing polymer is used, and usually it indicates about 0.01% or less with respect to the pure hydroxyl group-containing polymer.

Polymers containing hydroxyl groups generally have high affinity for metal hydroxides and salts that are commonly used as catalysts and, therefore, metal salts readily adsorb into and remain in the interior of hydroxy group-containing polymers, making their removal very difficult even by washing. Furthermore, since hydroxyl group-containing polymers themselves dissolve in water, washing with water is often impossible. In contrast, according to the production process of the invention it is possible to introduce hydroxyl groups into a polymer without a metal catalyst and it is, therefore, possible to obtain a hydroxyl group-containing polymer containing no ash, without any additional washing steps or the like.

One embodiment of the process for producing polymers with hydroxyl groups according to the invention has been explained above, but the invention is not limited thereto and the reaction does not necessarily need to be conducted in a homogeneous system. For example, the process may be one conducted by dispersing an organic solvent solution of the substituent-containing polymer in high temperature, high pressure water. Another possible process is one in which an aqueous suspension of the polymer is continuously supplied to a high temperature reactor and the reaction time is controlled so that it is as short a time as possible.

The process of the invention may be conducted using a reaction apparatus constructed with a pressure-resistant container, cooler and other devices attached thereto, for contact of the substituent-containing polymer with the high temperature, high pressure water. The process of the invention may be conducted as a batch system or a continuous system. For example, in the case of a batch system, the substituent-containing polymer and water are loaded into the vessel and the temperature and pressure are raised to the prescribed levels while stirring. The weight ratio of water with respect to the polymer used is 1–100 parts by weight to 1 part by weight of the polymer. The reaction time cannot be specified for all situations, since it will vary depending on the type of polymer, the conditions for the reaction and the desired reaction rate, but it will normally be within a few hours. For a continuous flow system, the reaction rate may be governed by controlling the reaction time to within units of seconds.

Having now generally described this invention, a further understanding can be obtained by reference to certain specific examples which are provided herein for purposes of illustration only and are not intended to be limiting unless otherwise specified.

EXAMPLES

Example 1

After loading 50 g of distilled water and 5 g of polyvinyl acetate (solution polymerized product with an average polymerization degree of about 1700, Kuraray, KK.) in a pressure-resistant vessel with an inner volume of 100 ml, the contents were heated while stirring until the temperature reached 530° K. The pressure at this time reached 4.5 MPa. After holding the inner temperature at 530° K for 30 minutes, the reactor was rapidly cooled and the product removed, and the liquid product was vacuum dried overnight at 40° C. to obtain 2.71 g of product. The product was a slightly yellowish transparent solid, and the infrared absorption spectrum obtained from a Fourier transform infrared spectrometer (FT-IR) confirmed the introduction of hydroxyl groups into the product.

Figure 2:
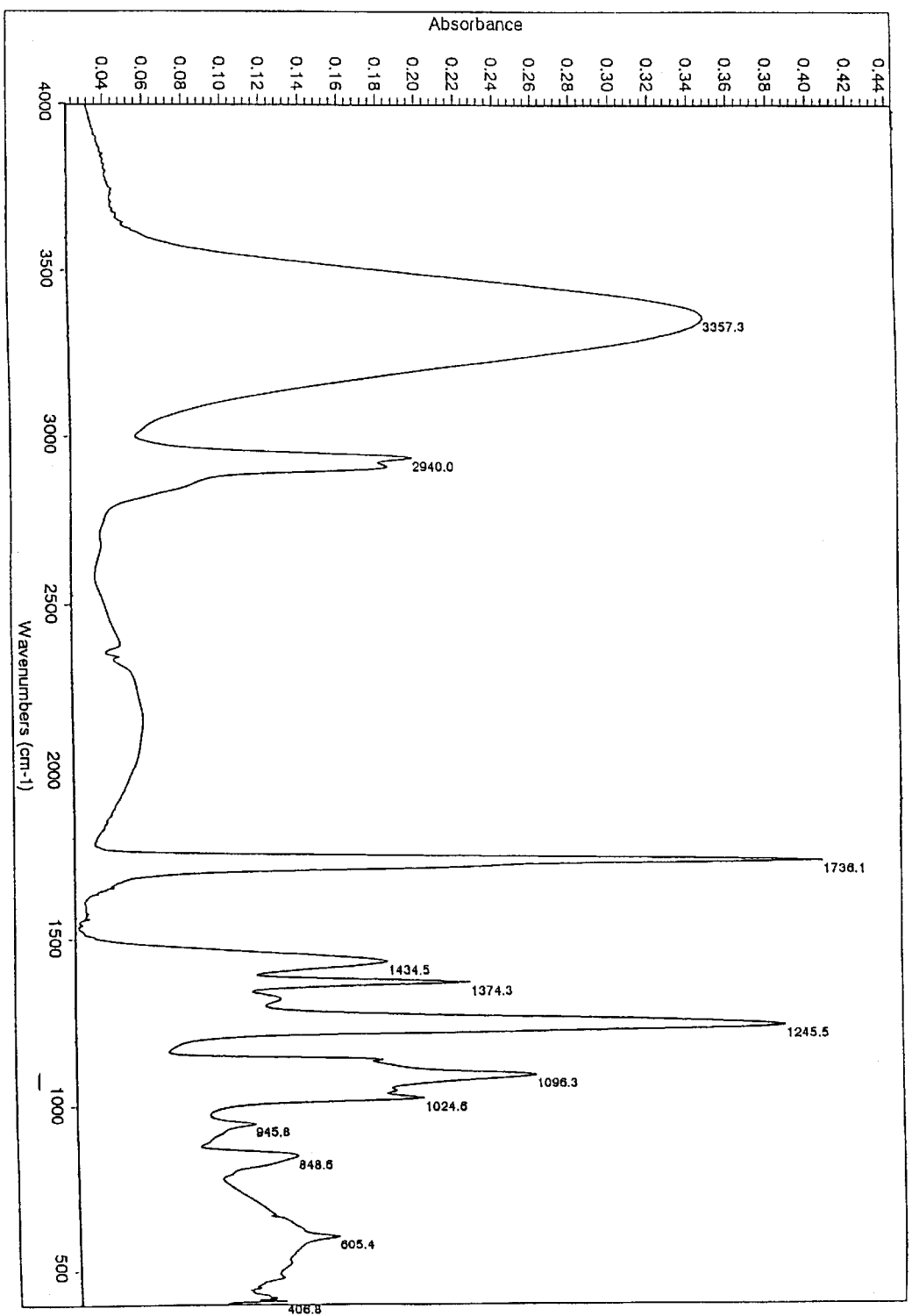
FIG. 2 is an IR spectrum for a product solid polymer.

FIG. 1 is an IR spectrum of polyvinyl acetate starting material, and FIG. 2 is an IR spectrum of the product solid. FIG. 2 confirms the introduction of hydroxyl groups into the polymer by the presence of a peak near 3300 $cm^{-1}$ which is attributable to hydroxyl groups. This absorption is not observed in FIG. 1. Upon calculating the conversion rate of ester groups to OH groups based on the intensity ratio for the peak near 2900 $cm^{-1}$ attributable to C—H and the peak at 1700 $cm^{-1}$ attributable to the C=O bond of the ester groups, 80% conversion to hydroxyl groups was confirmed. The product yield calculated from this conversion was 2.71 g, which corresponded to a theoretical yield of 89%. After then placing 2 g of the product in a porcelain crucible and firing for 2 hours in air in a 700° C. electric furnace, the measurement of the weight of the residue was attempted, but it was below the detectable limit (below 0.0001 g).

Example 2

Example 1 was repeated except that the temperature was 650° K and the reaction time was 10 minutes. The pressure reached 25 MPa at a temperature of 650° K. The product was a yellowish transparent solid. Into which the introduction of hydroxyl groups was confirmed in the same manner as described in Example 1. 90% conversion of ester groups to hydroxyl groups was found. The product yield was 1.9 g, which corresponded to a 68% theoretical yield of polymer in which 90% of the ester groups had been converted to hydroxyl groups. The amount of ash was below the detectable limit.

Example 3

Example 1 was repeated except that the temperature was 500° K and the reaction time was one hour. The reactor pressure reached 2.5 MPa at a temperature of 500° K. Introduction of hydroxyl groups was confirmed in the same manner as described in Example 1, and 70% conversion of ester groups to hydroxyl groups was found. The product yield was 3.0 g, which was a theoretical yield of 91%. The amount of ash was below the detectable limit.

Example 4

Example 1 was repeated except that the temperature was 430° K and the reaction time was one hour. The reactor pressure was 0.6 MPa. A virtually colorless liquid and a solid were both present in the reactor after cooling, and these materials were subjected to vacuum drying together. The product was a yellowish transparent solid. Introduction of hydroxyl groups into the polymer was confirmed in the same manner as described in Example 1, and 40% conversion of ester groups to hydroxyl groups was found. The yield was 3.7 g, which was a theoretical yield of 92%. The amount of ash was below the detectable limit.

Example 5

Ethylene-vinyl acetate copolymer (solution polymerized product with an average polymerization degree of about 900 and an ethylene content of 45 mole percent; Kuraray, KK.) was used instead of the polyvinyl acetate in Example 1. After cooling the reactor, the solid was filtered from the obtained suspension and subjected to vacuum drying overnight at 40° C. to obtain a white powder. Introduction of hydroxyl groups in the powder was confirmed by the infrared absorption spectrum in the same manner as described in Example 1. It was found that 85% of ester groups had been converted into hydroxyl groups. The amount of ash was below the detectable limit.

Example 6

Polyvinyl methyl ether was used instead of the polyvinyl acetate described in Example 1. A yellowish solid product was obtained by the same procedure as described in Example 1, and introduction of hydroxyl groups was confirmed. It was found that 75% of methoxy groups were converted to hydroxy groups. The amount of ash was also below the detectable limit.

Comparative Example 1

After loading 50 g of water and 5 g of polyvinyl acetate (solution polymerized product with an average polymerization degree of about 1700, Kuraray, KK.) in a vessel with an inner volume of 100 ml, the suspension was stirred for 2 hours at room temperature (300° K) and normal pressure. The solid in the reactor was then removed by filtration, washed twice with 50 g of water, and then vacuum dried overnight at 40° C. No hydroxyl groups had been introduced into the polymer as confirmed by the infrared absorption spectrum of the product.

Comparative Example 2

The same procedure as described in Comparative Example I was conducted, with further addition of 0.25 g of sodium hydroxide. No hydroxyl groups were introduced into the resulting solid.

The disclosure of Japanese Application Number 223152/1999 filed Aug. 6, 1999 is hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A process, comprising:
    contacting a polymer having ester groups bound to the polymer backbone by an oxygen atom, or alkoxy groups, with water at a temperature ranging from 373 to 800° K and a pressure ranging from 0.1 to 62 Mpa, which converts the ester groups or alkoxy groups to hydroxyl groups, thereby forming a polyvinyl alcohol containing substantially no ash and which does not contain volatile organic compounds.

2. The process according to claim 1, wherein the main chain of the polymer having said substituent is composed of carbon-carbon bonds.

3. The process for a polymer claim 1, wherein the polymer with said substituent is polyvinyl acetate.

4. The process according to claim 1, wherein said temperature ranges from 473 to 750° K.

5. The process according to claim 4, wherein said temperature ranges from 510 to 600° K.

6. The process according to claim 1, wherein the polymer is a poly(carboxylic acid vinyl ester) or a poly(vinyl carboxylate) copolymer.

7. The process according to claim 1, wherein the weight ratio of water to polymer ranges from 1–100 parts by weight to 1 part by wt.

8. A process, comprising:

contacting a poly(carboxylic acid vinyl ester), a poly(vinyl carboxylate) copolymer and a poly(vinyl alkyl ether) with water at a temperature ranging from 373 to 800° K and a pressure ranging from 0.1 to 62 Mpa, which converts the ester groups or alkoxy groups to hydroxyl groups, thereby forming a polyvinyl alcohol containing substantially no ash and which does not contain volatile organic compounds.

* * * * *